United States Patent [19]

Miller

[11] 4,261,622
[45] Apr. 14, 1981

[54] AUTOMOTIVE VEHICLE WHEEL FOR TRAVEL ON ICE OR SNOW

[76] Inventor: James B. Miller, 426 Polk St., River Rouge, Mich. 48218

[21] Appl. No.: 62,567

[22] Filed: Aug. 1, 1979

[51] Int. Cl.³ ............................................. B60B 15/00
[52] U.S. Cl. .................................... 301/38 R; 301/46
[58] Field of Search ........... 152/152; 301/38 R, 39 R, 301/39 T, 40 R, 40 S, 41 R, 43, 44 R, 44 T, 44 A, 44 B, 45, 46, 50, 63 R, 47

[56] References Cited

U.S. PATENT DOCUMENTS

| | | |
|---|---|---|
| 1,245,335 | 11/1917 | Hahn ...................................... 301/40 |
| 1,310,732 | 7/1919 | Bodman ................................. 301/44 A |
| 1,319,590 | 10/1919 | Kitto ...................................... 301/50 |
| 1,749,917 | 3/1930 | Meadowcroft ...................... 301/63 R |
| 3,116,094 | 12/1963 | Glasgow ................................. 301/38 |

FOREIGN PATENT DOCUMENTS 259339 10/1926 United Kingdom ................. 301/44 A

*Primary Examiner*—H. Grant Skaggs

[57] ABSTRACT

A wheel for replacing a conventional rear wheel of an automotive vehicle, for travel on deep snow or ice-covered surfaces; the wheel including a circular wheel plate of steel, and teeth around its periphery, which each comprises a steel crosshead welded transversely across the periphery, and a replaceable cleat of rubber, bolted to the crosshead, each cleat including extendable carbide steel studs.

1 Claim, 4 Drawing Figures

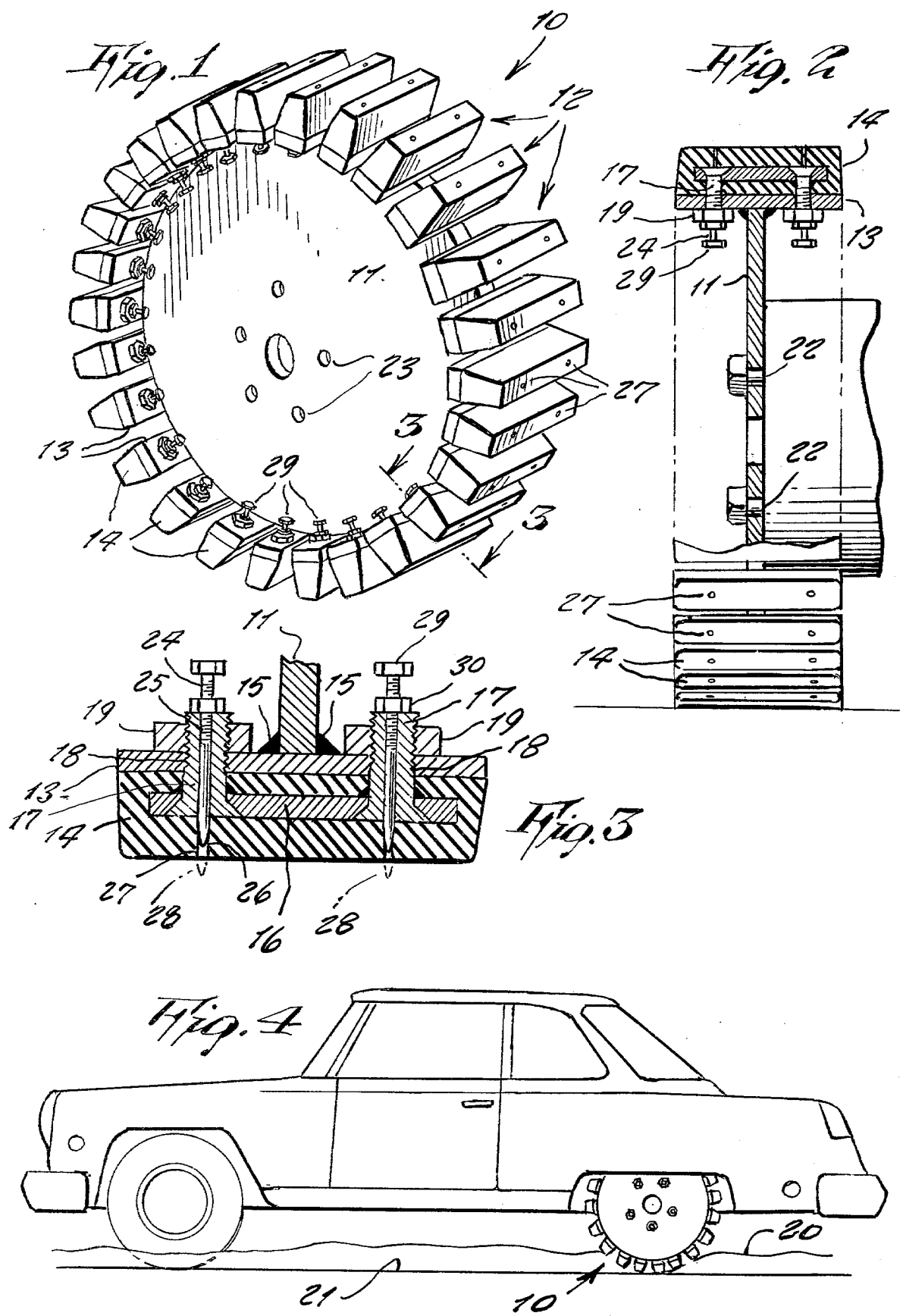

AUTOMOTIVE VEHICLE WHEEL FOR TRAVEL ON ICE OR SNOW

This invention relates generally to wheels for automotive vehicles.

It is well known, that numerous devices have been developed for preventing an automotive vehicle from getting stuck in deep snow. A most common is the snow tire, which is the same as a regular tire, except that it has a larger and deeper tread design, so as to hold against snow. However, it has the limitation of not being effective enough when snow gets deep, so that in bad snow storms, such equipped vehicles are still seen stuck alongside snowbound roads and highways. This situation is, therefore, in need of an improvement.

Therefore, it is a principal object of the present invention to provide a new type of wheel, for replacing a rear wheel of an automotive vehicle, and which has cleats several inches deep, so that is can get traction, even in snow of a depth up to the vehicle body.

Another object is to provide a snow wheel, which can be used on any type of automotive vehicle, such as a passenger car, truck, bus, or farm and road machinery.

Still another object is to provide a snow wheel, which will provide traction, not only on snow, but also on ice, sand and mud.

Other objects are to provide a snow wheel, that is simple in design, inexpensive to manufacture, rugged in construction, easy to use and efficient in operation.

These, and other objects, will be readily evident, upon a study of the following specification, and the accompanying drawing, wherein:

FIG. 1 is a perspective view of the invention, shown including adjustable studs so as to use on icy surfaces;

FIG. 2 is an end view of the snow wheel, shown partly in cross-section;

FIG. 3 is an enlarged cross-section of one of the cleats, as viewed on line 3—3 of FIG. 1; and more clearly illustrating the adjustable studs shown retracted inside the cleat, and FIG. 4 is a side view of a vehicle with the invention installed thereupon for going on snow.

Referring now to the drawing in greater detail, the reference numeral 10 represents a snow wheel, according to the present invention, wherein there is a circular steel plate 11, having a row of teeth 12 around its periphery.

Each tooth comprises a rectangular steel plate or crosshead 13, and a replaceable crossbar or cleat 14, that is attached to the crosshead. Each crosshead is approximately seven inches long, and is welded to the circular steel plate 11, as shown at 15, each crosshead being positioned so as to straddle the peripheral rim of the plate 11 transversely. Each cleat is the same length and width as the crosshead, but is relatively several inches thicker, being molded of a hard rubber similar to that of conventional tires. A steel reinforcement plate 16 is imbedded inside the cleat, while two threaded bolts 17, welded at one end to the plate 16, protrude outwardly from the cleat, in order to be inserted into holes 18 through the crosshead, and then fitted with a nut 19, so as to secure the cleat to the crosshead rigidly. Thus, the cleat provides great height to the tooth, so as to be effective for traction in deep snow 20 on a road surface 21.

In use, the snow wheels can be carried inside a trunk compartment of an automobile, similarly to a spare tire wheel, so as always to be available, in case of a snowstorm. The vehicle rear wheels are removed and the snow wheels are then mounted on the rear axle brake drums, by means of the wheel studs 22 being inserted through holes 23 provided on the wheel plate 11. The snow wheel is the same diameter as the standard tired wheel of the vehicle, and the cleat length is the same as the width of the inflated tire. The cleats are relatively close together, so as not to give a bumpy ride. If any cleat wears out, it can be replaced easily by unscrewing the nuts 19.

The present invention also includes means that easily convert the snow wheel for use upon icy roads, so as not to skid. This comprises a stud 24, of carbide steel, being thread engaged within a threaded hole 25 in the center of each bolt 17, so that a pointed end 26 of the studs can be either retracted deep inside a hole 27 in the cleat (when not in use), or extended, so that the pointed end protrudes slightly outwardly of the cleat, as shown at 28 (when in use on ice-covered road surfaces). A hexagonal head 29, on the other end of each stud, allows the same to be turned easily by a wrench. A lock nut 30 serves to hold the stud rigidly from turning, when either in extended or retracted position. On icy inclines, the studs 24 can be further advanced for greater traction.

While various changes may be made in the detailed construction, it is understood that such changes will be within the spirit and scope of the present invention, as is defined by the appended claims.

What I now claim is:

1. A snow wheel, for replacing a rear wheel of an automotive vehicle, comprising, in combination, a circular steel plate provided with mounting holes, and a plurality of transverse extending teeth around a periphery of said plate, each said tooth comprising a crosshead made of plate steel, welded to said periphery, and a replaceable cleat bolted against an outer side of said crosshead; said cleat comprising a reinforcement plate imbedded inside a hard rubber covering therearound, a pair of bolts welded to said reinforcement plate protruding outward through said covering, and inserted through openings in said crosshead, and a nut on each said bolt being abutted against an inner side of said crosshead; and a stud threadingly engaged through the center of each said bolt; a pointed end of said stud extending into a radially extending hole through an outer side of said covering, and adjustably outward through said covering hole.

* * * * *